(12) United States Patent
Allewaert et al.

(10) Patent No.: US 6,239,247 B1
(45) Date of Patent: May 29, 2001

(54) FLUOROCHEMICAL COMPOSITION COMPRISING A URETHANE HAVING A FLUOROCHEMICAL OLIGOMER AND A HYDROPHILIC SEGMENT TO IMPART STAIN RELEASE PROPERTIES TO A SUBSTRATE

(75) Inventors: Kathy E. M. L. A. Allewaert, Haacht; Rudolf J. Dams, Zwijndrecht; Pierre J. Vander Elst, Elewijt, all of (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,865

(22) PCT Filed: May 14, 1998

(86) PCT No.: PCT/US98/89066

§ 371 Date: Sep. 24, 1999

§ 102(e) Date: Sep. 24, 1999

(87) PCT Pub. No.: WO98/51724

PCT Pub. Date: Nov. 19, 1998

(30) Foreign Application Priority Data

May 14, 1998 (EP) ................................. 97201388

(51) Int. Cl.$^7$ ................................. C08G 18/48
(52) U.S. Cl. ................. 528/49; 528/70; 528/75; 525/129; 427/389.9; 106/2; 524/591; 560/26; 560/115; 560/132
(58) Field of Search ............... 560/26, 132, 115; 528/49, 75, 70; 525/129; 427/389.9; 106/2; 524/591

(56) References Cited

U.S. PATENT DOCUMENTS

| 2,803,615 | 8/1957 | Ahlbrecht et al. | 260/29.6 |
|---|---|---|---|
| 2,841,573 | 7/1958 | Ahlbrecht et al. | 260/79.3 |
| 3,269,961 | 8/1966 | Bruson et al. | 260/2.5 |
| 3,574,791 | 4/1971 | Sherman et al. | 260/884 |
| 3,920,614 | 11/1975 | Kirimoto et al. | 260/63 |
| 4,046,944 | 9/1977 | Mueller et al. | 428/262 |
| 4,399,077 | 8/1983 | Vanlerberghe et al. | 260/501.13 |
| 4,508,916 | 4/1985 | Newell et al. | 556/420 |
| 4,540,765 | 9/1985 | Koemm et al. | 528/45 |
| 4,563,493 | 1/1986 | Fukui et al. | 524/233 |
| 4,695,488 | 9/1987 | Hisamoto et al. | 427/385.5 |
| 4,778,915 | 10/1988 | Lina et al. | 560/29 |
| 4,788,287 | 11/1988 | Matsuo et al. | 544/196 |
| 4,792,354 | 12/1988 | Matsuo et al. | 106/2 |
| 4,841,090 | 6/1989 | Patel | 558/437 |
| 4,859,754 | 8/1989 | Maekawa et al. | 526/245 |
| 4,920,190 | 4/1990 | Lina et al. | 526/288 |
| 5,100,954 | 3/1992 | Itoh et al. | 524/805 |
| 5,107,033 | 4/1992 | Pechold | 568/615 |
| 5,276,175 | 1/1994 | Dams et al. | 560/27 |
| 5,292,796 | 3/1994 | Dams et al. | 524/598 |
| 5,350,795 | 9/1994 | Smith et al. | 524/507 |
| 5,453,540 | 9/1995 | Dams et al. | 564/96 |
| 5,491,261 | 2/1996 | Haniff et al. | 562/582 |
| 5,509,939 | 4/1996 | Kirchner | 8/115.51 |
| 5,672,651 | 9/1997 | Smith | 524/590 |
| 5,841,027 | 11/1998 | Scarffe | 73/198 |

FOREIGN PATENT DOCUMENTS

| 526976 | 1/1997 | (EP) . |
|---|---|---|
| 2 050 396 | 1/1981 | (GB) . |
| 8-225493 | 3/1996 | (JP) . |
| WO 94/10222 | 5/1994 | (WO) . |

OTHER PUBLICATIONS

X–H. Yu et al., "Synthesis and Physical Properties of Poly(fluoralkylether) urethanes", *Journal of Applied Polymer Science*, vol. 41, 1777–1795 (1990).

*Primary Examiner*—Rachel Gorr
(74) *Attorney, Agent, or Firm*—Kent S Kokko

(57) ABSTRACT

The present invention provides a method for preparing a fluorochemical composition comprising a urethane by reacting: (A) fluorochemical oligomer of the formula (I): $M^f_m M_n$—$Q^1$—$T^1$ wherein $M^f_m M_n$ represents a fluorochemical oligomer comprising m units derived from fluorinated monomer and n units derived from fluorine-free monomer and wherein the fluorinated monomers and fluorine-free monomers may be the same or different; m is a value of about 2 to 40; n is a value of about 0 to 20; $T^1$ is an —OH or —$NH_2$ moiety; $Q^1$ and $T^1$ together represent an organic residue obtained by removing a hydrogen atom from a chain transfer agent that is functionalized with $T^1$; (B) monofunctional compound capable of reacting with an isocyanate and comprising a poly(oxyalkylene) group; (C) isocyanate blocking agent or a fluorine-free oligomer; and (D) isocyanate-reactive compound other than said fluorochemical oligomer, said isocyanate blocking agent, said fluorine-free oligomer and said monofunctional compound; with (E) diisocyanate or a triisocyanate, wherein 33% to 67% of the number of isocyanate groups are reacted with the fluorochemical oligomer according to the formula (I), 33% to 67% of the number of isocyanate groups are reacted with said monofunctional compound, 0 to 33% of the number of isocyanate groups are reacted with an isocyanate blocking agent or a fluorine-free oligomer and 0 to 10% of the number of isocyanate groups are reacted with said isocyanate-reactive compound.

17 Claims, No Drawings

FLUOROCHEMICAL COMPOSITION COMPRISING A URETHANE HAVING A FLUOROCHEMICAL OLIGOMER AND A HYDROPHILIC SEGMENT TO IMPART STAIN RELEASE PROPERTIES TO A SUBSTRATE

FIELD OF THE INVENTION

The present invention relates to fluorochemical compositions for the treatment of substrates, in particular fibrous substrates such as textiles to impart stain release properties to those substrates.

BACKGROUND OF THE INVENTION

Fluorochemical compositions for the treatment of substrates such as leather, textiles and paper are well known and are used to impart various properties to the substrate such as water and/or oil repellency, waterproofness, stain release, anti-staining etc. For example, U.S. Pat. No. 5,276,175 discloses isocyanate derivatives comprising fluorochemical oligomers. In particular, the disclosed fluorochemical compositions comprise fluorinated compounds, wherein the fluorinated compound comprises a fluorochemical oligomeric portion, an organic moiety, and a group that can impart soft hand, stain release, water repellency, or a durable property when the compound is applied to a fibrous substrate, wherein the fluorochemical oligomeric portion is bonded to the organic moiety through an isocyanate-derived linking group. Substrates so treated are shown to exhibit particularly durable and abrasion-resistant oil and water repellency. Further, in one of the examples there is shown a fluorochemical composition that is based on a condensate of a tri-isocyanate, a fluorochemical oligomer and a methoxy-polyethyleneoxide glycol. For this composition stain release properties are demonstrated on a polyester/cotton blend fabric.

U.S. Pat. No. 5,350,795 discloses fluorochemical compositions for treating textile fibers and fabrics to impart oil and water repellency without thermal treatment. The compositions comprise an aqueous, substantially organic solvent free, solution or dispersion of (a) a fluorochemical acrylate copolymer comprised of a fluorinated acrylate monomer, polyalkylene glycol acrylate or methacrylate, or polyalkylene glycol diacrylate or dimethacrylate; and (b) a polyalkoxylated polyurethane having pendant perfluoroalkyl groups comprised of an aliphatic or aromatic tri- or higher order isocyanate, a fluorinated alcohol, amine, or mercaptan, and a poly(oxyalkylene) diol or dithiol.

U.S. Pat. No. 4,788,287 and U.S. Pat. No. 4,792,354 disclose a water and oil repellent compound having at least two terminal segments and an intermediate segment connecting the terminal segments that has a molecular weight of from 800 to 20,000. Each terminal segment of the compound contains at least one polyfluoroalkyl group connected by a —CONH-linking group, the intermediate segment is a urethane oligomer that contains at least two —CONH— linking groups in one molecule, and the terminal segments and intermediate segment are connected by a —CONH-linking group. The urethane oligomer of U.S. Pat. No. 4,792,354 further contains a hydrophilic molecular chain.

U.S. Pat. No. 5,491,261 discloses di-, tri- and poly-perfluoroalkyl-substituted alcohols and acids and derivatives thereof which are prepared from perfluoroalkyl iodides and di-, tri- or polyalkyl alcohols or acids. They can be reacted with isocyanates, epoxy compounds, anhydrides, acids or acid derivatives to prepare a great variety of oil- and water-repellent compositions.

Fluorochemical compositions are also used to facilitate stain or soil release from a substrate such as for example a fabric. Routine treatments of fabrics with modifying additives such as softeners, stiffeners and lubricants impart desired properties to a commercial fabric, typically increase the oleophilicity of the fabric, thereby significantly increasing its tendency to accept oily stains and reducing its ability to release such stains after laundering. Fluorochemical compositions based on a mixture of a fluorinated compound and a non-fluorinated hydrophilic compound or on a chemical "hybrid" compound containing fluorochemical oleophobic segments ("F") and non-fluorinated hydrophilic segments ("H") are known to act as stain release compositions since they provide oil repellency during normal wear and inhibit wicking or diffusion of oily soils into the fabric or fiber bundles as well as facilitate soil release during laundering.

U.S. Pat. No. 3,574,791 discloses a block-copolymer consisting of F and H segments for use as a stain-release agent. The "F"-segments are substantially free of hydrophilic groups whereas the "H" segments are substantially free of fluorinated aliphatic groups. It is taught that due to this segmentation, the polymer is "autoadaptable," i.e., a fabric treated with the polymer will be oil and water repellent in an atmospheric environment, and when laundered in water it will become hydrophilic so stain removal becomes possible. Various possible chemical linkages are contemplated for connecting the "F" and "H" segments, including a urethane linkage derived from the reaction of an alcohol and an isocyanate.

U.S. Pat. No. 5,509,939 discloses a fluorochemical composition to impart soil release properties to a substrate. The fluorochemical composition comprises urea-linkage containing alkoxypolyoxyalkylene fluorocarbamates prepared by reacting (a) at least one polyisocyanate which contains at least three isocyanate groups with (b) at least one fluorochemical reagent which contains one functional group which has at least one hydrogen atom and at least two carbon atoms each of which contains at least two F atoms, (c) at least one hydrophilic, water-solvatable reagent which contains a single functional group which has at least one reactive hydrogen atom, and (d) at least one reagent which contains one reactive hydrogen atom, and which on reaction with an isocyanate group, yields functionality which has abeyant chemical reactivity with fibrous substrates, and then reacting the product with water, such that reactants (b), (c) and (d) are reacted with 55% to 95% of the isocyanate groups, and water is reacted with the remainder of the isocyanate groups.

Despite the many fluorochemical compositions known to impart stain release properties to a substrate, there continues to be a desire for fluorochemical compositions that have improved properties. Desirable properties include easy cleanability of natural fiber based substrates such as cotton and blends of cotton and polyester, particularly with respect to oil type stains (dirty motor oil, vegetable oil) and water based stains (tea, coffee); low manufacturing cost; high storage stability; easy emulsifiably and high performance even if applied in low quantities. It is further desirable that the fluorochemical compositions provide good stain repellency properties and oil and/or water repellency properties to the substrate.

SUMMARY OF THE INVENTION

The present invention provides a method for preparing a fluorochemical composition comprising a urethane by reacting:
(A) a Fluorochemical Oligomer of Formula (I):

$$M^f_m M_n - Q^1 - T^1 \tag{I}$$

wherein:
$M^f_m M_n$ represents a fluorochemical oligomer comprising m units derived from a fluorinated monomer and n units derived from a fluorine free monomer and wherein the fluorinated monomers may be the same or different and wherein the fluorine free monomers may be the same or different;

m represents a value of 2 to 40;

n represents a value of 0 to 20;

$T^1$ is selected from the group consisting of OH or $NH_2$ moieties; and $Q^1$ and $T^1$ together represent the organic residue obtained by removing a hydrogen atom from a chain transfer agent that is functionalized with $T^1$;

(B) a mono-functional compound capable of reacting with an isocyanate and comprising a poly(oxyalkylene) group;

(C) optionally an isocyanate blocking agent or a fluorine free oligomer; and (D) optionally an isocyanate reactive compound other than said fluorochemical oligomer, said isocyanate blocking agent, said fluorine free oligomer and said mono-functional compound; with (E) a di-isocyanate or a tri-isocyanate such that 33% to 67% of the number of isocyanate groups are reacted with said fluorochemical oligomer according to formula (I), 33% to 67% of the number of isocyanate groups are reacted with said mono-functional compound, 0 to 33% of the number of isocyanate groups are reacted with an isocyanate blocking agent or a fluorine free oligomer and 0 to 10% of the number of isocyanate groups are reacted with said isocyanate reactive compound.

The present invention further provides a fluorochemical composition comprising a urethane obtainable by the above method and the use of the fluorochemical composition to provide stain release properties to a substrate.

Further provided is the treatment of a substrate using one of the fluorochemical compositions described herein and a substrate treated with one of said fluorochemical compositions.

DETAILED DESCRIPTION OF THE INVENTION

In connection with the present invention, the term "monofunctional" means a compound that contains only one functional group capable of reacting with an isocyanate.

The term "functionalized fluorochemical oligomer" means a fluorochemical oligomer that contains a functional group capable of reacting with an isocyanate.

The fluorochemical compositions of the present invention can be prepared in a two step reaction. In a first step, a functionalized fluorochemical oligomer is prepared, which is further reacted in a second step to form a urethane.

In the first step, a flurochemical oligomer according to formula (I) is prepared:

$$M^f_m M_n—Q^1—T^1 \qquad (I)$$

wherein:

$M^f_m M_n$ represents fluorochemical oligomer comprising m units derived from fluorinated monomer and n units derived from fluorine-free monomer and wherein the fluorinated monomers and fluorine-free monomers may be the same or different;

m represents a value of 2 to 40;

n represents a value of 0 to 20;

$T^1$ is a —OH or —$NH_2$ moiety; and $Q^1$ and $T^1$ together represent the organic residue obtained by removing a hydrogen atom from a chain transfer agent that is functionalized with $T^1$.

The value of m in the fluorochemical oligomer is between 2 and 40, preferably between 2 and 20 and more preferably between 3 and 15. The value of n can be from 0 to 20 and is preferably between 3 and 10. According to a preferred embodiment, the value of n is less than that of m. Fluorochemical oligomers derived from two or more different fluorinated monomers and/or two or more different fluorine-free monomers are within the scope of this invention.

In the above formulas, $Q^1$ typically represents an organic residue according to the following formula:

—S—R— wherein

R represents an organic divalent linking group preferably selected from the group consisting of linear or branched alkylenes (preferably having about 2 to 6 carbon atoms), cyclic alkylenes, arylenes and aralkylenes.

The fluorochemical oligomer can be prepared by free-radical oligomerization of fluorochemical monomers ($R_f$—$L^1$—E) alone or in combination with hydrocarbon monomers ($R_h$—E'), in the presence of hydroxy- or amino-functionalized chain transfer agents. The term "hydrocarbon", in connection with the present invention, means any fluorine-free organic moiety that contains hydrogen and carbon, and optionally, one or more substituents. The aliphatic backbone of the fluorochemical oligomeric comprises a sufficient number of polymerized units to render the portion oligomeric. The aliphatic backbone preferably comprises from 2 to 40 polymerized units derived from fluorochemical monomers and from 0 to 20 polymerized units derived from hydrocarbon monomers.

The fluoroaliphatic radical, $R_f$, in the fluorochemical monomer, is a fluorinated, stable, inert, preferably saturated, non-polar, monovalent aliphatic radical. It can be straight chain, branched chain, cyclic or combinations thereof. It can contain heteroatoms such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 and up 18 carbon atoms, preferably 3 to 14, and especially 6 to 12 carbon atoms. Preferably $R_f$ contains 40% to 80% fluorine by weight and more preferably 50% to 78% fluorine by weight. The terminal portion of the $R_f$ radical is a perfluorinated moiety, and will preferably contain at least 7 fluorine atoms. e.g., $CF_3CF_2CF_2$—, $(CF_3)_2CF$—, $F_5SCF_2$—. The preferred $R_f$ radicals are fully or fluofinated and preferably follow the formula $C_nF_{2n+1}$— where n is 3 to 18.

The linking group, $L^1$, links the $R_f$ radical to the free radical polymerizable group E. $L^1$ preferably contains from 1 to 20 carbon atoms. $L^1$ can optionally contain oxygen, nitrogen, or sulfur-containing groups or a combination thereof, and $L^1$ is preferably free of functional groups that interfere with free-radical oligomerization (e.g., polymerizable olefinic double bonds, thiols, and other such functionality known to those skilled in the art). Examples of suitable $L^1$ groups include straight chain, branched chain or cyclic alkylene, arylene, aralkylene, oxy, oxo, hydroxy, thio, sulfonyl, sulfoxy, amino, imino, sulfonamido, carboxyamido, carbonyloxy, urethanylene and ureylene groups and combinations thereof such as sulfonamidoalkylene. Preferred linking groups are selected from the group consisting of alkylene groups, poly(oxyalkylene) groups having 1 to 4 oxyalkylene moieties and organic divalent linking groups according to the following formula:

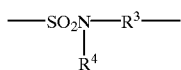

wherein:
$R^3$ represents a linear or branched alkylene group having 2 to 4 carbon atoms, and
$R^4$ represents an alkyl group having 1 to 4 carbon atoms.
$R_h$ is a fluorine-free organic group.

E and E' are free radically polymerizable groups that typically contain an ethylenically unsaturated moiety capable of polymerization with itself or each other. Suitable moieties include, for example, those derived from vinyl ethers, vinyl esters, allyl esters, vinyl ketones, styrenes, vinyl amides, acrylamides, maleates, fumarates, acrylates and methacrylates. Of these, the esters of alpha, beta unsaturated acids, such as the acrylates and methacrylates are preferred.

Fluorochemical monomers $R_f$—$L^1$—E as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976. Preferred examples of fluorochemical monomers include:

$CF_3(CF_2)_4CH_2OCOC(CH_3)=CH_2$ $CF_3(CF_2)_6(CH_2)_2OCOC(CH_3)=CH_2$ $CF_3(CF_2)_6(CH_2)_2OCOCH=CH_2$ $CF_3(CF_2)_6CH_2OCOC(CH_3)=CH_2$ $CF_3(CF_2)_6CH_2OCOCH=CH_2$ $CF_3(CF_2)_7(CH_2)_2OCOCH=CH_2$ $$CF_3(CF_2)_7SO_2\underset{R}{N}C_2H_4OCOCH=CH_2$$

$CF_3CF_2(CF_2CF_2)_{2-8}CH_2CH_2OCOCH=CH_2$ $$CF_3(CF_2)_7SO_2\underset{R}{N}C_2H_4OCOC(CH_3)=CH_2$$

$$CF_3(CF_2)_7CH_2CH_2SO_2\underset{CH_3}{N}CH_2CH_2OCOC(CH_3)=CH_2$$

R=methyl, ethyl or n-butyl

Suitable hydrocarbon monomers, $R_h$—E', are also known and generally commercially available. Examples of such compounds include the general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and esters such as vinyl, allyl, methyl, butyl, isobutyl, hexyl, heptyl, 2-ethyl-hexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha, beta-unsaturated carboxylic acid derivatives such as allyl alcohol, allyl glycolate, acrylamide, methacrylamide, n-diisopropyl acrylamide, diacetoacrylarnide, N,N-diethylaminoethylmethacrylate, N-t-butylamino ethyl methacrylate; styrene and its derivatives such as vinyl toluene, alpha-methylstyrene, alpha-cyanomethyl styrene; lower olefinic hydrocarbons which contain halogen such as ethylene, propylene, isobutene, 3-chloro-1-isobutene, isoprene, and allyl or vinyl halides such as vinyl and vinylidene chloride. Preferred co-monomers which can be copolymerized with the above-described fluoroaliphatic radical-containing monomers include those selected from octadecylmethacrylate, laurylmethacrylate, butylacrylate, N-methylol acrylamide, isobutylmethacrylate, ethylhexyl acrylate, ethylhexyl methacrylate, glycidyl methacrylate, vinylchloride and vinylidene chloride.

The hydroxy- or amino-functionalized chain transfer agents useful in the preparation of the fluorochemical oligomer preferably correspond to the following formula:

HS—R—X wherein R is as defined herein and X is an —OH or —$NH_2$ moiety.

Examples of chain transfer agents include those selected from the group consists of 2-mercaptoethanol, 3-mercapto-2-butanol, 3-mercapto-2-propanol, 3-mercapto-1-propanol and 2-mercapto-ethylamine. A single compound or a mixture of different chain transfer agents may be used. A preferred chain transfer agent is 2-mercaptoethanol.

In order to prepare the functionalized fluorochemical oligomer, a free-radical initiator is normally present. Such free-radical initiators are known in the art and include azo compounds, such as azobisisobutyronitrile (AIBN) and azobis(2-cyanovaleric acid) and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

In a second step, the fluorochemical oligomer (or mixture of fluorochemical oligomers), and the monofunctional compound capable of reacting with an isocyanate group are reacted with the diisocyanate or triisocyanate. The reaction may optionally further include an isocyanate blocking agent or a fluorine-free oligomer and/or a further isocyanate-reactive compound other than the fluorochemical oligomer, monofunctional compound, isocyanate blocking agent or fluorine-free oligomer. It will be appreciated by one skilled in the art that the preparation of urethanes according to the present invention results in a mixture of compounds.

Generally, the fluorochemical oligomer is used in an amount sufficient to react with 33% to 67% of the number of isocyanate groups, the monofunctional compound is used in an amount sufficient to react 33% to 67% of the number of isocyanate groups, and the isocyanate blocking agent or fluorine-free oligomer is used to react 0 to 33% of the number of isocyanate groups. The further isocyanate-reactive compound can be used in an amount to react 0 to 10% of the number of isocyanate groups.

Preferably, the oxyalkylene moieties in the poly (oxyalkylene) group of the mono-functional compound 2 to 4 carbon atoms. Examples of such moieties include —$OCH_2$—$CH_2$—, —$OCH_2$—$CH_2$—$CH_2$—, —$OCH(CH_3)$$CH_2$—, and —$OCH(CH_3)CH(CH_3)$—. The oxyalkylene moieties can be the same, as in poly(oxypropylene), or present as a mixture, as in a heteric straight or branched chain or a chain of andomly distributed oxyethylene and oxypropylene mmoieties, or as in a straight or branched chain of blocks of oxyethylene units and blocks of oxypropylene moieties. The poly(oxyalkylene) chain can be interrupted by or include one or more catenary linkages. Where the catenary linkages have three or more valences, they provide a means for obtaining a branched chain of oxyalkylene moieties. Preferably, the number of oxyalkylene moieties in the poly(oxyalkylene) group is between 5 and 120 and more preferably between 17 and 48.

According to a particularly preferred embodiment, the monofunctional compound corresponds to the following formula:

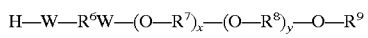

$$H-W-R^6W-(O-R^7)_x-(O-R^8)_y-O-R^9$$

wherein:

W is selected from the group consisting of O, NH, or S;

$R^6$ represents an alkylene having 1 to 4 carbon atoms;

$R^7$ and $R^8$ are each independently selected from the group consisting of linear or branched alkylene groups having 2 to 4 carbon atoms;

$R^9$ represents an alkyl group having 1 to 4 carbon atoms; and x and y are each independently selected integers of 0 to 60, provided the sum is at least 5.

Preferably, $R^7$ is ethylene and $R^8$ is a linear or branched propylene group, and the ratio of x to y is at least 1 and preferably greater than 1. Most preferably, y is 0 and $R^7$ is ethylene.

Typical examples of monofunctional compounds comprising a poly(oxyalkylene) group include alkyl ethers of polyglycols such as e.g., methyl or ethyl ether of polyethyleneglycol, hydroxy-terminated methyl or ethyl ether of a random or block copolymer of ethyleneoxide and propyleneoxide, and an amino-terminated methyl or ethyl ether of polyethyleneoxide.

Diisocyanates or triisocyanates for use in accordance with the present invention include aliphatic and aromatic isocyanates. Examples include aromatic diisocyanates such as 4,4'-methylenediphenylenediisocyanate, 4,6-di-(trifluoromethyl)-1,3-benzene diisocyanate, 2,4- toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro- 1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic triisocyanates such as polymethylenepolyphenylisocyanate (PAPI); cyclic diisocyanates such as isophorone diisocyanate (IPDI) and dicyclohexylmethane-4,4'-diisocyanate.

Also useful are isocyanates containing internal, isocyanate-derived moieties such as biuret-containing triisocyanates some of which are available from Bayer as DESMODUR™ N-100, isocyanurate-containing triisocyanates some of which are available from Huls AG, Germany, as IPDI-1890, and azetedinedione-containing diisocyanates some of which are available from Bayer as DESMODUR™ TT. Other commercially available diisocyanates or triisocyanates including those available from Bayer as DESMODUR™ L and DESMODUR™ W, and tri-(4-isocyanatophenyl)-methane (DESMODUR™ R from Bayer).

Optionally, isocyanate blocking agents can be used. Such agents includes compounds that, upon reaction with an isocyanate group, yield a compound that is unreactive at room temperature with isocyanate-reactive compounds, but at room temperature react with isocyanate-reactive compounds. Suitable isocyanate blocking agents will typically react with isocyanate reactive compounds at a temperature of 50 to 190° C. Examples of isocyanate blocking agents that can be used include aryl alcohols (e.g., phenols, cresols, nitrophenols, o- and p- chlorophenol, napthols, 4-hydroxybiphenyl); $C_2$ to $C_8$ alkanone oximes (e.g., acetone oxime, butanone oxime); benzophenone oxime; aryl-thiols (e.g., thiophenol); organic carbanion active hydrogen compounds (e.g., diethyl malonate, acetylacetone, ethyl acetoacetate, ethylcyanoacetate) and epsilon-caprolactone. A single compound or a mixture of different masking or blocking agents may be used. Particularly preferred isocyanate blocking or masking agents include $C_2$ to $C_8$ alkanone oximes, e.g., 2-butanone oxime.

The fluorine-free oligomer that can optionally be used to prepare the urethane may be prepared in a manner similar to the method used to prepare the fluorochemical oligomer, however only fluorine-free monomers are used. Suitable fluorine-free monomers include those of the type $R_h$—E' described herein. According to a particularly preferred embodiment, the fluorine-free oligomer is derived by oligomerizing at least one monomer containing functional group that is capable of cross-linking upon activation (for example by heating). Typical examples of such functional groups include blocked isocyanates and alkoxysilane groups. Examples of suitable fluorine-free monomers include alkoxysilane-functionalized acrylates and methacrylates or monomers that contain a blocked isocyanate (such as the reaction product of 2-hydroxy-ethyl-(meth)acrylate), a diisocyanate and an isocyanate blocking agent. The fluorine-free oligomer preferably has a polymerization degree between 2 and 40 and more preferably between 3 and 20.

The preparation of the urethane may optionally contain minor amounts of a further isocyanate-reactive compound other than those described above. Typically, isocyanate-reactive compounds contain only one isocyanate-reactive group. Examples of such isocyanate-reactive compounds include alkanols (e.g., methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol, (iso)stearylalcohol), and primary or secondary amines (e.g., butyl amine).

The condensation reaction is carried out under conventional conditions well-known to those skilled in the art. Preferably the reaction is run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from 0.001 percent to 10 percent, preferably 0.1 percent to 5 percent, by weight based on the total weight of the reactants.

The condensation reaction is preferably carried out under dry conditions in a polar solvent such as ethyl acetate, acetone, methyl isobutyl ketone, toluene and the like. Suitable reaction temperatures will be easily determined by those skilled in the art based on the particular reagents, solvents, and catalysts being used. While it is not practical to enumerate particular temperatures suitable for all situations, generally suitable temperatures are between room temperature and 120° C.

The fluorochemical composition of this invention can be applied using conventional application methods but is preferably used as an aqueous emulsion. Alternatively, it can be used as a treatment composition in solvent. An aqueous emulsion will generally contain water, an amount of fluorochemical composition effective to provide the desired repellent properties to a substrate, and a surfactant in an amount effective to stabilize the emulsion. Water is preferably present in an amount of 70 to 2000 parts by weight based on 100 parts by weight of the fluorochemical composition of the invention. The surfactant is preferably present in an amount of 1 to 25 parts by weight, preferably 2 to 10 parts by weight, based on 100 parts by weight of the fluorochemical composition. Conventional cationic, nonionic, anionic, and zwitterionic surfactants are suitable.

The amount of the aqueous or solvent-based treating composition applied to a substrate should be sufficient to impart high stain release properties to the substrate. Typically an amount sufficient to provide about 0.01% to 5% by weight, and preferably bu 0.05% to 2% by weight, based on the weight of the substrate, of fluorochemical composition on the treated substrate is adequate. The amount of treatment composition sufficient to impart the desired stain release properties can be determined empirically and can be increased as necessary or desired.

To the fluorochemical composition of the invention there may also be added other fluorinated products, polymers or auxiliary products such as starch, dextrin, casein, polyvinyl alcohols, cellulose and cellulose derivatives such as cellulose ethers, copolymers of (meth)acrylic acid and an alkyl (meth)acrylate, polyglycols such polyethylene glycols, sizing agents, materials to improve water and/or oil repellency, fire proofing or antistatic properties, buffering agents, fungicidal agents, optical bleaching agents, sequestering agents, mineral salts, surface-active agents, or swelling agents to promote penetration. Preferably, copolymers of an alkyl (meth)acrylate and (meth)acrylic acid are used as auxilliary products in the fluorochemical composition. Typically, the weight ratio of (meth)acrylic acid to alkyl (meth)acrylate weight ratio in such polymers is between 20:80 to 90:10, and more preferably between 50:50 to 85:15. It is further preferred that the alkyl group of the (meth)acrylate is a lower alkyl group having 1 to 6 carbon atoms. Examples of alkyl (meth)acrylates include, methyl, ethyl and n-butyl acrylates and methacrylates. The copolymer of an alkyl (meth)acrylate and (meth)acrylic acid may further contain units derived from ethylenically unsaturated monomers, but preferably the copolymer only contains units or moieties derived from alkyl (meth)acrylates and (meth)acrylic acid. The copolymer may also be partially or fully neutralized with a base such as sodium hydroxide or ammonium hydroxide.

Particularly suitable auxiliary products for use in the fluorochemical composition include polyvinyl alcohols and non-ionic cellulose ethers. Examples of non-ionic cellulose ether derivatives include methyl cellulose, hydroxypropyl cellulose and methylhydroxypropyl cellulose. Preferably, the etherified cellulose is highly hydrophilic. Accordingly, cellulose ethers that contain large hydrophobic substituents such as the hydrophobically modified cellulose ether (available under the tradename NEXTON™ from Aqualon) are not preferred for use in the fluorochemical composition of this invention.

The substrates treated by the fluorochemical composition of this invention are not especially limited and include plastic, metal, glass, fibrous materials such as textile fabrics, wood, non-wovens and paper. The fluorochemical composition is particularly useful for imparting stain release properties to a substrate that comprises natural fibers, in particular a substrate that consists of cellulose fibers or a substrate consisting of cellulose and polyester fibers. Substrates treated with a fluorochemical composition of this invention have particular good stain release properties for dirty motor oil stains and tea stains.

In order to affect treatment of a textile substrate, the substrate can be immersed in a diluted emulsion. The saturated substrate can then be run through a padder/roller to remove excess emulsion, dried and cured in an oven at a temperature and for a time sufficient to provide a cured treated substrate. This curing process is typically carried out at temperatures between 50° C. and 190° C. depending on the particular system or application method used. In general, a temperature of 120° C. to 170° C., in particular of 150° C. to 170° C. for a period of 20 seconds to 10 minutes, preferably 3 to 5 minutes, is suitable.

The invention is further illustrated by reference to the following examples without however the intention to limit the invention thereto.

EXAMPLES

Formulation and Treatment Procedure

Treatment baths were formulated containing a defined amount of the fluorochemical treatment agent. Treatments were applied to the test substrates by padding to provide a concentration of 0.3% or 0.6% solids (based on fabric weight and indicated as SOF (solids on fabric)) and drying the samples at 150° C. during 3 minutes. The test substrates used in the examples were commercially available and are listed below:

* PES/CO: polyester/cotton 67/33 blends, available from Arlitex, Avelgem, Belgium.
* 100% cotton : available from UCO company, Destelbergen, Belgium After drying, the substrates were tested for their stain release and repellency properties.

Respective data of stain release, water and oil repellency shown in the Examples and Comparative Examples were based on the following methods of measurement and evaluation criteria:

Stain Release Test

The stain release test was performed using two types of stains:

Dirty Motor Oil (DMO) obtained from General Motors Garage Houttequiet, Beveren; Belgium Tea: obtained by immersing a Lipton™ yellow teabag in 165 ml of water at 65° C. for 3 minutes Staining Procedure 1: Drop Method 10 cm×10 cm test samples were stained with 3 drops DMO or tea for PES/CO or with 4 drops DMO or tea for cotton. The samples were equilibrated at room temperature during 24 hours after which the degree of staining was evaluated by measuring the difference in reflection of a stained versus unstained sample, using a Minolta color meter (Lamp D65). An average of 3 measurements were done for each stain, resulting in a $\Delta L_{IN}$ value.

Staining Procedure 2: Brush Method

For this procedure, 0.35 ml DMO or 0.5 ml tea for PES/CO or 0.5 ml DMO or 0.6 ml tea for cotton were placed on 10 cm×10 cm test samples. The stain was brushed into the fabric by brushing 3 times around in a plastic holder of 5 cm diameter placed around the staining liquid. The reflection measurement was done as described above.

Laundering Procedure

The test samples were pinned on a PES/CO ballast (total 3 kg) or a cotton ballast (total 4 kg), and laundered in a Miele washing machine type W 832. A commercial detergent (20 g/kg Clax 100 for PES/CO or Clax crystal for cotton, available from Diversy Lever) was added and the substrates were washed at 70° C., using the main washing program, followed by four rinse cycles and centrifuging. The samples were dried in a tumble dryer and ironed at 150° C. for 15 seconds. Unstained samples were treated the same way. The samples were measured with the Minolta meter and compared to unstained samples, resulting in a $\Delta L_{LD70°\,C.}$ value.

The less negative value for $\Delta L_{LD70°\,C.}$ obtained compared to $\Delta L_{IN}$, the better the stain release properties were. %$\Delta\Delta L$, calculated according to formula %$\Delta\Delta L=(\Delta L_{IN}-\Delta L_{LD70°\,C.}/\Delta L_{IN})\times 100$ gave an indication of the percentage of stain removed during the laundering process. The higher the value, the better the stain removal.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid which did not penetrate or wet the substrate surface after 15 seconds of exposure. Substrates which were penetrated by or were resistant only to a 100% water test liquid (0% isopropyl alcohol), the least penetrating test liquid, were given a rating of 0. Substrates resistant to test liquids which were 100% isopropyl alcohol (0% water), the most penetrating test liquid, were given a rating of 10. Other intermediate ratings were calculated by dividing the percent isopropyl alcohol in the test liquid by 10, e.g., a treated substrate resistant to a 70%/30% isopropyl alcohol/water blend, but not to an 80%/20% blend, would be given a rating of 7.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Abbreviations

The following abbreviations and trade names were used in the Examples and Comparative Examples:

EtOAc: ethylacetate
RSH: 2-mercapto ethanol
AIBN: azo(bis)isobutyronitrile
HOEMA: 2-hydroxyethyl methacrylate
BA: butylacrylate
Y 11857; tri-isopropoxy silane methacrylate, available from OSI company, Belgium
TMI: 1-(1-isocyanato-1-methyl ethyl)-4(1-methyl ethenyl) benzene, available from Cyanamid, Belgium
MEFOSEA: M-methyl perfluorooctyl sulfonamido ethyl acrylate
$MPEG^{350-5000}$: polyethlene glycol methyl ether, the superscript numbers indicative of Mw, available from Inspec, Belgium
BO: 2-butanone oxime
IPDI: isophorone diisocyanate
DBTDL: dibutyltin dilaurate
MEHQ: methylhydroquinone
DESN : aliphatic polyisocyanate, available from Bayer (Germany) as DESMODUR™ N
DESL: aromatic triisocyanate, available from Bayer (Germany) as DESMODUR™ L
PAPI: Voronate M220, polyaromatic polymethylene polyisocyanate, available from Dow Chemical (Netherlands)
Arquad T-50: tallow trimethyl ammonium chloride, available from Akzo, Littleborough, UK All parts, ratios, percentages etc. in the following examples are by weight unless otherwise noted.

A. Synthesis of Hydroxy Terminated Oligomers (HTO)

1. Synthesis of Urethane Acrylate HOEMA/IPDI/BO (molar ratio 1/1/1)

The urethane acrylate HOEMA/IPDI/BO (molar ratio 1/1/1), used in the preparation of hydroxy terminated oligomers was prepared as follows:

A round bottom flask equipped with a mechanical stirrer, a temperature control, addition funnel, and nitrogen inlet and outlet, was charged with 111 g (0.5 moles) IPDI, 65 g (0.5 moles) HOEMA, 200 g EtOAc, 0.1 g phenotiazin, 0.1 g MEHQ and 0.2 g dibutyl tin dilaurate. The reaction mixture was slowly heated to about 50° C. A solution of 44 g (0.5 moles) 2-butanone oxime, dissolved in 20 g EtOAc was added over a period of 1 hour. Then the reaction mixture was stirred at 72° C. for 6 hours. IR analysis indicated that all isocyanate groups had reacted.

2. Synthesis of Hydroxy Terminated Oligomers (HTO)

The hydroxy terminated oligomers (HTO) given in Table 1 were made according to a procedure similar to the synthesis of MEFOSEA/RSH 4/1 (indicated as HTO-1 in Table 1):

A round bottom flask equipped with two reflux condensers, a stirrer, a temperature control, a nitrogen inlet and a vacuo outlet was charged with 2.4 moles (1433 g) MEFOSEA and 987 g EtOAc. The mixture was heated at 40° C. until all fluorochemical monomers were dissolved. 0.6 moles (46.8 g) 2-mercaptoethanol and 0.15% AIBN were added. The reaction mixture was gradually heated to 80° C. The reaction was run under nitrogen atmosphere at 80° C. for 16 hours, after which more than 95% conversion was obtained.

TABLE 1

Composition of Hydroxy Terminated Oligomers (HTO)

| Oligomer | Composition | Molar Ratio |
|---|---|---|
| HTO-1 | MEFOSEA/RSH | 4/1 |
| HTO-2 | MEFOSEA/RSH | 8/1 |

TABLE 1-continued

Composition of Hydroxy Terminated Oligomers (HTO)

| Oligomer | Composition | Molar Ratio |
|---|---|---|
| HTO-3 | (HOEMA[1]/IPDI[1]/BO[1])/BA/RSH | 1/3/1 |
| HTO-4 | BA/Y11857/RSH | 4.075/0.125/1 |
| HTO-5 | BA/Y11857/RSH | 4.5/0.5/1 |
| HTO-6 | (TMI[1]/BO[1])/BA/RSH | 1/3/1 |

B. Synthesis of Fluorochemical Compounds (FC)

Several fluorochemical compounds given in Table 2 were prepared using a procedure that is similar to the synthesis of DESL/HTO-1/MPEG$^{750}$/BO 1/1/1/1 (FC-7 in Table 2).

A round bottom flask equipped with a condenser, thermometer, stirrer and nitrogen inlet was charged with 7.85 g (0.008 moles) Desmodur L, 20.18 g HTO-1, 6 g (0.008 moles) PEG$^{750}$ and 81 g methyl isobutyl ketone. The reaction mixture was heated to 50° C. and 0.7 g (0.008 moles) 2-butanone oxime was added, followed by addition of catalyst (DBTDL). The temperature of the mixture was raised to 85° C. and the reaction was run until completion.

C. Emulsification

The fluorochemical compound obtained under step B (20 g solids) was added to deionised water containing 1.2 g Arquad T-50 (50% solids) emulsifier. The mixture was homogenized using an ultrasonic probe (Branson 250 sonifier) after which the organic solvent was removed under vacuum. An emulsion containing 15% fluorochemical compound was obtained.

TABLE 2

Composition of Fluorochemical Urethanes (FC)

| FC | Composition of Fluorochemical Compound | Molar Ratio |
|---|---|---|
| FC-1 | DESN/HTO-1/HTO-3/MPEG$^{750}$ | 1/1/1/1 |
| FC-2 | DESN/HTO-1/HTO-3/MPEG$^{2000}$ | 1/1/1/1 |
| FC-3 | DESN/HTO-2/HTO-3/MPEG$^{2000}$ | 1/1/1/1 |
| FC-4 | DESN/HTO-1/MPEG$^{2000}$ | 1/1.5/1.5 |
| FC-5 | DESN/HTO-1/MPEG$^{5000}$ | 1/1.5/1.5 |
| FC-6 | DESN/HTO-1/MPEG$^{2000}$ | 1/1/2 |
| FC-7 | DESL/HTO-1/MPEG$^{750}$/BO | 1/1/1/1 |
| FC-8 | DESL/HTO-2/MPEG$^{2000}$/BO | 1/1/1/1 |
| FC-9 | DESL/HTO-1/MPEG$^{2000}$/BO | 1/1/1/1 |
| FC-10 | DESL/HTO-2/MPEG$^{750}$/BO | 1/1.5/0.5 |
| FC-11 | DESN/HTO-1/HTO-4/MPEG$^{750}$ | 1/1/1/1 |
| FC-12 | DESN/HTO-1/HTO-5/MPEG$^{750}$ | 1/1/1/1 |
| FC-13 | DESN/HTO-1/HTO-6/MPEG$^{750}$ | 1/1/1/1 |
| FC-14 | PAPI/HTO-1/MPEG$^{350}$/BO | 1/1/1/1 |

Examples 1 to 10 and Comparative Example C-1

In Examples 1 to 10, fluorochemical compositions according to the invention were prepared and emulsified following the general procedure described above. Polyester/cotton (PES/CO) blends were treated with the fluorochemical compositions so as to give 0.3 or 0.6% SOF. After treatment, the fabrics were dried at 150° C. for 3 minutes. The treated PES/CO substrates were stained with dirty motor oil using the drop method. Comparative Example C-1 was made with untreated PES/CO fabric. The stain release and oil and water repellency results are given in Table 3.

TABLE 3

Stain Release (DMO-Drop) and Repellency Properties of Treated PES/CO

| Ex No | Fluoro-chemical Compound | % SOF | Initial Performance OR | Initial Performance WR | Stain Release Color Measurement $\Delta L_{IN}$ | Stain Release Color Measurement $\Delta L_{LD70°C.}$ | Stain Release Color Measurement %$\Delta\Delta L$ |
|---|---|---|---|---|---|---|---|
| 1 | FC-1 | 0.3 | 5 | 7 | −6.85 | −0.74 | 89 |
| 2 | FC-1 | 0.6 | 5 | 8 | −6.37 | −2.44 | 62 |
| 3 | FC-11 | 0.3 | 5 | 5 | −11.22 | −5.08 | 55 |
| 4 | FC-11 | 0.6 | 6 | 8 | −8.3 | −1.7 | 80 |
| 5 | FC-12 | 0.3 | 5 | 8 | −6.81 | −0.72 | 89 |
| 6 | FC-12 | 0.6 | 6 | 9 | −9.71 | −2.49 | 74 |
| 7 | FC-13 | 0.3 | 5 | 5 | −9.62 | −4.89 | 49 |
| 8 | FC-13 | 0.6 | 6 | 8 | −10.42 | −3.33 | 68 |
| 9 | FC-7 | 0.3 | 4 | 4 | −4.72 | −2.03 | 57 |
| 10 | FC-14 | 0.6 | 5 | 5 | −6.79 | −2.18 | 68 |
| C-1 | — | — | 0 | 0 | −15.45 | −9.56 | 38 |

The data shows that all of the fluorochemical compositions provided good to very good DMO stain release.

Examples 11 to 18 and Comparative Example C-2

In Examples 11 to 18, the same type of experiment was repeated but this time the DMO was applied to the fabric by the brush method. Comparative Example C-2 was made with untreated PES/CO fabric. The stain release and oil and water repellency results are given in Table 4.

TABLE 4

Stain Release (DMO-Brush Method) and Repellent Properties of Treated PES/CO

| Ex No | Fluoro-chemical Compound | % SOF | Initial Performance OR | Initial Performance WR | Stain Release Color Measurement $\Delta L_{IN}$ | Stain Release Color Measurement $\Delta L_{LD70°C.}$ | Stain Release Color Measurement %$\Delta\Delta L$ |
|---|---|---|---|---|---|---|---|
| 11 | FC-2 | 0.3 | 2 | 5 | −17.88 | −7.64 | 57 |
| 12 | FC-3 | 0.3 | 1 | 3 | −17.67 | −8.05 | 54 |
| 13 | FC-4 | 0.6 | 6 | 9 | −18.09 | −6.6 | 64 |
| 14 | FC-5 | 0.3 | 3 | 2 | −17.97 | −9.78 | 46 |
| 15 | FC-6 | 0.6 | 4 | 9 | −18.73 | −7.6 | 59 |
| 16 | FC-8 | 0.3 | 2 | 3 | −18.01 | −7.87 | 56 |
| 17 | FC-9 | 0.3 | 1 | 3 | −17.77 | −7.48 | 58 |
| 18 | FC-10 | 0.6 | 5 | 5 | −18.17 | −9.16 | 50 |
| C-2 | — | — | 0 | 0 | −15.32 | −8.67 | 43 |

The results indicate that even in the more severe brush method, good DMO stain release for fabric treated with the fluorochemical compositions was observed. The fluorochemical compositions not only provided the fabric with good DMO stain release, but also with medium to high oil and water repellency which presents a further advantage.

Examples 19 to 26 and Comparative Example C-3

In Examples 19 to 26, the same type of experiment as above was repeated with 100% cotton substrates, treated with the fluorochemical compositions according to the general procedure described above. DMO stain was applied to the cotton using the brush method. Comparative Example C-3 was made with untreated cotton fabric. The results of stain release and oil and water repellency are given in Table 5.

TABLE 5

Stain Release (DMO-Brush Method) and Repellent Properties of Treated Cotton

| Ex No | Fluoro-chemical Compound | % SOF | Initial Performance | | Stain Release Color Measurement | | |
|---|---|---|---|---|---|---|---|
| | | | OR | WR | $\Delta L_{IN}$ | $\Delta L_{LD70° C.}$ | %$\Delta\Delta L$ |
| 19 | FC-2 | 0.6 | 4 | 4 | −19.89 | −8.25 | 59 |
| 20 | FC-3 | 0.6 | 2 | 3 | −19.9 | −7.96 | 60 |
| 21 | FC-4 | 0.6 | 4 | 7 | −19.49 | −8.22 | 58 |
| 22 | FC-5 | 0.6 | 2 | 3 | −18.03 | −8.83 | 51 |
| 23 | FC-6 | 0.6 | 3 | 5 | −19.38 | −8.34 | 57 |
| 24 | FC-8 | 0.6 | 3 | 1 | −19.23 | −8.18 | 57 |
| 25 | FC-9 | 0.3 | 2 | 2 | −18.7 | −8.3 | 56 |
| 26 | FC-10 | 0.3 | 2 | 2 | −19.5 | −8.45 | 57 |
| C-3 | — | — | 0 | 0 | −15.70 | −8.76 | 44 |

The data shows that treatment with the fluorochemical composition provided good percentage of stain removal (%$\Delta\Delta L$) for oily stains (such as DMO) on cotton.

Examples 27 to 35 and Comparative Example C-4

In Examples 27 to 35, PES/CO blends treated with the fluorochemical compositions according to the invention were stained with tea using the drop method. Comparative Example C-4 was made with untreated fabric. The results of stain release and oil and water repellency are given in Table 6.

TABLE 6

Stain Release (Tea-Drop Method) and Repellent Properties of Treated PES/CO

| Ex No | Fluoro-chemical Compound | % SOF | Initial Performance | | Stain Release Color Measurement | | |
|---|---|---|---|---|---|---|---|
| | | | OR | WR | $\Delta L_{IN}$ | $\Delta L_{LD70° C.}$ | %$\Delta\Delta L$ |
| 27 | FC-1 | 0.3 | 5 | 7 | −3.73 | −0.34 | 91 |
| 28 | FC-1 | 0.6 | 5 | 8 | −4.14 | −0.22 | 95 |
| 29 | FC-11 | 0.3 | 5 | 5 | −4.01 | −0.98 | 76 |
| 30 | FC-11 | 0.6 | 6 | 8 | −5.82 | −0.68 | 88 |
| 31 | FC-12 | 0.3 | 5 | 8 | −5.44 | −0.79 | 85 |
| 32 | FC-12 | 0.6 | 6 | 9 | −6.79 | −0.72 | 89 |
| 33 | FC-13 | 0.3 | 5 | 5 | −5.73 | −0.59 | 90 |
| 34 | FC-7 | 0.6 | 5 | 4 | −6.68 | −0.61 | 91 |
| 35 | FC-14 | 0.6 | 5 | 5 | −6.31 | −0.75 | 88 |
| C-4 | — | — | 0 | 0 | −2.32 | −0.91 | 61 |

Examples 36 to 43 and Comparative Example C-5

In Examples 36 to 43, the same treated PES/CO substrates were tested with tea stains, but now using the brush method. Comparative Example C-5 was made with untreated material. The results of stain release and oil and water repellency are given in Table 7.

TABLE 7

Stain Release (Tea-Brush Method) and Repellent Properties of Treated PES/CO

| Ex No | Fluoro-chemical Compound | % SOF | Initial Performance | | Stain Release Color Measurement | | |
|---|---|---|---|---|---|---|---|
| | | | OR | WR | $\Delta L_{IN}$ | $\Delta L_{LD70° C.}$ | %$\Delta\Delta L$ |
| 36 | FC-2 | 0.3 | 2 | 5 | −1.59 | −0.75 | 53 |
| 37 | FC-3 | 0.3 | 1 | 3 | −1.66 | −0.65 | 61 |

TABLE 7-continued

Stain Release (Tea-Brush Method) and Repellent Properties of Treated PES/CO

| Ex No | Fluoro-chemical Compound | % SOF | Initial Performance | | Stain Release Color Measurement | | |
|---|---|---|---|---|---|---|---|
| | | | OR | WR | $\Delta L_{IN}$ | $\Delta L_{LD70° C.}$ | %$\Delta\Delta L$ |
| 38 | FC-4 | 0.6 | 6 | 9 | −2.25 | −0.72 | 68 |
| 39 | FC-5 | 0.3 | 3 | 2 | −2.66 | −1.13 | 58 |
| 40 | FC-6 | 0.6 | 4 | 9 | −2.01 | −0.55 | 73 |
| 41 | FC-8 | 0.6 | 3 | 4 | −2.12 | −1.05 | 50 |
| 42 | FC-9 | 0.6 | 3 | 4 | −2.12 | −0.9 | 58 |
| 43 | FC-10 | 0.6 | 5 | 5 | −1.92 | −1.24 | 35 |
| C-5 | — | — | 0 | 0 | −2.62 | −1.22 | 53 |

Although in some cases the percentage stain removal for the tea stain was not much better or even inferior than the untreated samples, almost all treated samples showed a much less negative value for $\Delta L_{LD70° C.}$ than the untreated sample, indicating a less visible stain after laundering in case of the samples treated with a fluorochemical composition of the invention.

Examples 44 to 51 and Comparative Example C-6

In Examples 44 to 51, cotton substrates treated with the fluorochemical compositions of the present invention were stained with tea using the brush method. Comparative Example C-6 was made with untreated material. The results of stain release and oil and water repellency are given in Table 8.

TABLE 8

Stain Release (Tea-Brush Method) and Repellent Properties of Treated Cotton

| Ex No | Fluoro-chemical Compound | % SOF | Initial Performance | | Stain Release Color Measurement | | |
|---|---|---|---|---|---|---|---|
| | | | OR | WR | $\Delta L_{IN}$ | $\Delta L_{LD70° C.}$ | %$\Delta\Delta L$ |
| 44 | FC-2 | 0.3 | 1 | 2 | −2.16 | −0.42 | 81 |
| 45 | FC-3 | 0.3 | 1 | 2 | −2.58 | −0.59 | 77 |
| 46 | FC-4 | 0.3 | 2 | 5 | −3.19 | −1.19 | 63 |
| 47 | FC-5 | 0.3 | 0 | 2 | −3.86 | −1.39 | 64 |
| 48 | FC-6 | 0.3 | 2 | 4 | −3.72 | −1.38 | 63 |
| 49 | FC-8 | 0.3 | 1 | 0 | −3.18 | −1.05 | 67 |
| 50 | FC-9 | 0.3 | 2 | 2 | −2.89 | −0.85 | 71 |
| 51 | FC-10 | 0.3 | 2 | 2 | −2.48 | −0.84 | 66 |
| C-6 | — | — | 0 | 0 | −3.21 | −1.36 | 58 |

The results indicate that cotton fabric treated with the fluorochemical compositions of the invention showed high tea stain removal. Also medium water repellency properties were obtained.

What is claimed is:

1. A method for preparing a fluorochemical composition comprising a urethane by reacting:

(A) a fluorochemical oligomer of formula (I)

wherein:

$M^f_m M_n$ represents a fluorochemical oligomer comprising m units derived from a fluorinated monomer and n units derived from a fluorine free monomer and wherein the fluorinated monomers may be the same or different and wherein the fluorine free monomers may be the same or different;

m represents a value of 2 to 40;

n represents a value of 0 to 20;

T$^1$ is selected from the group consisting of OH or NH$_2$ moieties; and

Q$^1$ and T$^1$ together represent the organic residue obtained by removing a hydrogen atom from a chain transfer agent that is functionalized with T$^1$;

(B) a mono-functional compound reactive with an isocyanate and comprising a poly(oxyalkylene) group;

(C) optionally an isocyanate blocking agent or fluorine free oligomer; and (D) optionally an isocyanate reactive compound other than said fluorochemical oligomer, said isocyanate blocking agent, said fluorine free oligomer and said mono-functional compound; with (E) di-isocyanate or tri-isocyanate;

such that 33% to 67% of the number of isocyanate groups are reacted with said fluorochemical oligomer according to formula (I), 33% to 67% of the number of isocyanate groups are reacted with said monofunctional compound, 0 to 33% of the number of isocyanate groups are reacted with an isocyanate blocking agent or a fluorine-free oligomer and 0 to 10% of the number of isocyanate groups are reacted with said isocyanate-reactive compound.

2. A method according to claim 1, wherein said fluorinated monomer corresponds to the following formula:

$$R_f-L^1-E$$

wherein:

R$_f$ is selected from the group consisting of perfluorinated or partially fluorinated aliphatic groups;

L$^1$ represents an organic divalent linking group and;

E represents a free radical polymerizable group.

3. A method according to claim 2, wherein E is an acrylate or a methacrylate group, L$^1$ is selected from the group consisting of alkylene groups, poly(oxyalkylene) groups having 1 to 4 oxyalkylene moieties, and organic divalent linking groups according to the following formula:

$$-SO_2N-R^3-$$
$$\phantom{-SO_2N}|$$
$$\phantom{-SO_2N}R^4$$

wherein:

R$^3$ is selected from the group consisting of linear or branched alkylene groups having 2 to 4 carbon atoms, and R$^4$ represents an alkyl group having 1 to 4 carbon atoms.

4. A method according to claim 1, wherein Q$^1$ corresponds to the formula:

$$-S-R-$$

wherein:

R represents an organic divalent linking group selected from the group consisting of linear or branched alkylene groups, cyclic alkylene groups and arylene groups.

5. A method according to claim 1, wherein said monofunctional compound corresponds to the following formula:

$$H-W-R^6-(O-R^7)_x-(O-R^8)_y-O-R^9$$

wherein:

W is selected from the group consisting of O, NH, and S;

R$^6$ represents an alkylene having 1 to 4 carbon atoms;

R$^7$ and R$^8$ are each independently selected from the group consisting of linear and branched alkylene groups having 2 to 4 carbon atoms;

R$^9$ represents an alkyl group having 1 to 4 carbon atoms; and x and y are each independently selected integers of 0 to 60, provided the sum of x and y is at least 5.

6. A method of treatment of a substrate comprising the step of contacting said substrate with a fluorochemical composition comprising a urethane obtainable by the method of claim 1.

7. A method according to a claim 6, wherein said substrate is a fibrous substrate.

8. A method according to claim 7, wherein said substrate comprises natural fibers.

9. A method according to claim 7, wherein said substrate is fibrous and the fibers are selected from the group consisting of cellulose fibers, polyester fibers and combinations thereof.

10. A method according to claim 6, wherein said fluorochemical composition further comprises a polymer selected from the group consisting of polyvinyl alcohols, copolymers of (meth)acrylic acid and alkyl esters of (meth)acrylic acid, polyethylene glycols and non-ionic cellulose ethers.

11. A fluorochemical composition comprising a urethane obtained by the method of claim 1.

12. A fluorochemical composition according to claim 11, further comprising a polymer selected from the group consisting of polyvinyl alcohols, copolymers of (meth)acrylic acid and alkyl esters of (meth)acrylic acid, polyethylene glycols and non-ionic cellulose ethers.

13. A substrate comprising on at least part of at least one surface a fluorochemical composition as defined in claim 12.

14. The method of claim 6, wherein said fluorochemical composition is used in amounts sufficient to provide 0.01 to 5 weight percent of said fluorochemical composition on said substrate.

15. An emulsion comprising the composition of claim 11 further comprising water, and a surfactant in an amount sufficient to stabilize the emulsion.

16. The emulsion of claim 15 comprising 100 parts by weight fluorochemical composition, 70 to 2000 parts by weight water and 1 to 25 parts by weight surfactant.

17. The method of claim 2 wherein said fluorochemical monomer is selected from the group consisting of:

$$CF_3(CF_2)_4CH_2OCOC(CH_3)=CH_2$$

$$CF_3(CF_2)_6(CH_2)_2OCOC(CH_3)=CH_2$$

$$CF_3(CF_2)_6(CH_2)_2OCOCH=CH_2$$

$$CF_3(CF_2)_6CH_2OCOC(CH_3)=CH_2$$

$$CF_3(CF_2)_6CH_2OCOCH=CH_2$$

$$CF_3(CF_2)_7(CH_2)_2OCOCH=CH_2$$

$$CF_3(CF_2)_7SO_2\underset{\underset{R}{|}}{N}C_2H_4OCOCH=CH_2$$

$$CF_3CF_2(CF_2CF_2)_{2-8}CH_2CH_2OCOCH=CH_2$$

$$CF_3(CF_2)_7SO_2\underset{\underset{R}{|}}{N}C_2H_4OCOC(CH_3)=CH_2, \text{ and}$$

$$CF_3(CF_2)_7CH_2CH_2SO_2\underset{\underset{CH_3}{|}}{N}CH_2CH_2OCOC(CH_3)=CH_2$$

wherein R=methyl, ethyl or n-butyl.

* * * * *

UNITED STATES PATENT AND TRADEMARK OFFICE
CERTIFICATE OF CORRECTION

PATENT NO. : 6,239,247 B1
DATED : May 29, 2001
INVENTOR(S) : Allewaert, Kathy

It is certified that error appears in the above-identified patent and that said Letters Patent is hereby corrected as shown below:

Title page,
Item [86], PCT Pub. No., "PCT/US98/89066" should read -- PCT/US98/09866 --
Item [57], ABSTRACT, the following paragraph should be added:
-- Substrates treated with the fluorochemical composition made according to the method described above have good stain release properties particularly for oily stains and water-based stains such as wine, tea and coffee. --

Column 4,
Line 49, "fluofinated" should read -- fluorinated --

Column 6,
Line 3, "diacetoacrylarnide," should read -- diacetoacrylamide --

Column 7,
Line 13, "$H-W-R^6W-(O-R^7)_x-(O-R^8)_y-O-R^9$" should read
-- $H-W-R^6-(O-R^7)_x-(O-R^8)_y-O-R^9$ --

Column 9,
Line 24, "preferably bu 0.05%" should be -- preferably 0.05% --

Column 12,
Line 7, "polyethlene" should read -- polyethylene --

Column 15,
Line 48, the following paragraph should be added: -- A high percentage of tea stain removal was observed. --

Signed and Sealed this

Ninth Day of March, 2004

JON W. DUDAS
*Acting Director of the United States Patent and Trademark Office*